(12) United States Patent
Kawada

(10) Patent No.: US 10,092,988 B2
(45) Date of Patent: Oct. 9, 2018

(54) TOOL POT

(71) Applicant: OKUMA CORPORATION, Niwa-gun (JP)

(72) Inventor: Naoki Kawada, Niwa-gun (JP)

(73) Assignee: OKUMA CORPORATION, Niwa-gun (JP)

( * ) Notice: Subject to any disclaimer, the term of this patent is extended or adjusted under 35 U.S.C. 154(b) by 121 days.

(21) Appl. No.: 14/927,903

(22) Filed: Oct. 30, 2015

(65) Prior Publication Data

US 2016/0121446 A1    May 5, 2016

(30) Foreign Application Priority Data

Oct. 30, 2014    (JP) ................. 2014-221612

(51) Int. Cl.
*B23Q 3/155* (2006.01)
*B23Q 3/157* (2006.01)

(52) U.S. Cl.
CPC ..... *B23Q 3/15526* (2013.01); *B23Q 3/15553* (2013.01); *B23Q 3/1572* (2013.01); *B23Q 2003/15532* (2016.11); *Y10T 483/1836* (2015.01); *Y10T 483/1864* (2015.01); *Y10T 483/1891* (2015.01)

(58) Field of Classification Search
CPC ......... Y10T 483/1891; Y10T 483/1864; Y10T 483/1836; Y10T 483/1809; B23Q 2003/15527; B23Q 2003/15531; B23Q 2003/15532; B23Q 3/15526; B23Q 3/15724; B23Q 3/1572; B23Q 3/15553
See application file for complete search history.

(56) References Cited

U.S. PATENT DOCUMENTS

| | | | | |
|---|---|---|---|---|
| 4,182,021 A | * | 1/1980 | Kato | B23Q 3/15526 211/1.56 |
| 5,688,215 A | * | 11/1997 | Mase | B23Q 3/15733 211/1.55 |
| 6,428,454 B1 | * | 8/2002 | Yokota | B23Q 3/15526 211/1.56 |
| 7,094,190 B2 | * | 8/2006 | Sakuragi | B23Q 3/15526 483/59 |
| 7,115,083 B2 | * | 10/2006 | Liu | B23Q 3/15553 483/65 |

(Continued)

FOREIGN PATENT DOCUMENTS

| | | | |
|---|---|---|---|
| JP | 2002-126961 A | | 5/2002 |
| JP | 2002273633 A | * | 9/2002 |

(Continued)

OTHER PUBLICATIONS

Notification of Reasons for Refusal drafted on Jan. 23, 2018 issued for corresponding Japanese Patent Application No. 2014-221612.

*Primary Examiner* — Daniel Howell
*Assistant Examiner* — Yasir Diab
(74) *Attorney, Agent, or Firm* — Locke Lord LLP

(57) ABSTRACT

A tool pot includes a resin-made pot body and a metallic reinforcing member embedded in the pot body by insert molding. The reinforcing member is provided with a reinforcing plate embedded in a portion including a horizontal pin insertion portion in the pot body. The reinforcing plate is provided with a lightening hole so as to avoid the horizontal pin insertion portion.

5 Claims, 7 Drawing Sheets

(56) References Cited

U.S. PATENT DOCUMENTS

| | | | | |
|---|---|---|---|---|
| 2002/0035019 A1* | 3/2002 | Ninomiya | .......... | B23Q 3/15526 483/59 |
| 2005/0143238 A1* | 6/2005 | Sakuragi | ............ | B23Q 3/15526 483/65 |
| 2005/0181919 A1* | 8/2005 | Sakuragi | ............ | B23Q 3/15526 483/65 |
| 2011/0245053 A1* | 10/2011 | Koyama | ............ | B23Q 3/15526 483/65 |

FOREIGN PATENT DOCUMENTS

| | | | |
|---|---|---|---|
| JP | 2007021672 A | * | 2/2007 |
| JP | 3173755 U | | 2/2012 |

\* cited by examiner

TOOL POT

BACKGROUND OF THE INVENTION

1. Field of the Invention

The present invention relates to a tool pot used in a machine tool such as a machining center or the like for an apparatus configured to automatically exchange tools.

2. Description of the Background Art

In a machine tool such as a machining center, if the number of tools required for machining a work, a stocker such as a tool magazine is installed in addition to a machine tool to hand over the tools between the machine tool and the stocker. When retaining the tools in the tool magazine, which corresponds to the stocker, a tool pot configured to house and retain the tools so as to be demountably mountable is used (For example, see JP-A-2002-126961).

The tool pot is generally formed of a resin mold, which is low in manufacturing costs and is produced on a large scale because a number of the tool pots having the same form are used. However, in the case of the tool pot formed of the resin mold, for example, a portion in which a mounting shaft is inserted and a portion where a steel ball is retained are not strong enough, and hence a configuration in which metallic reinforcing members are embedded in these portions is proposed.

Embedding of the metallic reinforcing member to the resin-made tool pot is generally performed by insert molding.

In the case of the insert molding, after the molding is performed at a temperature higher than the normal temperature, it is cooled down to the normal temperature. However, at the time of cooling, a thermal stress generates in the interior of a resin-made pot body due to a difference in coefficient of linear expansion between resin and metal, and hence fractures, cracks, or the like may occur in the pot body by the thermal stress at the time of using easily.

SUMMARY OF THE INVENTION

It is an object of the invention to provide a tool pot having a metallic reinforcing member embedded in a resin-made pot body by insert molding, and having no probability of generation of fractures or cracks in a pot body caused by a thermal stress.

The invention provides a tool pot including a resin-made pot body and a metallic reinforcing member embedded in the pot body by insert molding, wherein the reinforcing member has a form which can be resiliently deformed without hindering thermal contraction of the pot body at the time of cooling after the insert molding.

With the tool pot of the invention, the resin-made pot body and the metallic reinforcing member tend to effect thermal contraction at the time of cooling after the insert molding. However, with the resilient deformation of the reinforcing member, hindrance of the thermal contraction of the pot body is avoided and hence generation of thermal stress is restricted.

In a preferred mode of the tool pot of the invention, the reinforcing member is provided with a lightening portion at a required position to have the above-described shape.

With the tool pot having the above-described mode, generation of the thermal stress within the pot body is restricted by the lightening portion formed in the required position of the reinforcing member, and an influence exerted on a strength required for the reinforcing member is reduced.

In the tool pot having the above-described mode of the invention, the reinforcing member may be provided with a reinforcing plate embedded in a portion including a mounting shaft insertion portion in the pot body, and the lightening hole may be formed in the reinforcing plate so as to avoid the mounting shaft insertion portion.

In the case of the tool pot described above, the lightening hole is formed in the reinforcing plate of the reinforcing member so as to avoid the mounting shaft insertion portion, whereby the shape which allows the resilient deformation without hindering the thermal contraction of the pot body is achieved. Therefore, machining of the reinforcing member is easily and the strength required for reinforcing the mounting shaft insertion portion of the pot body is not hindered.

According to the tool pot of the invention, the strength of the metallic reinforcing member is enhanced, and generation of fractures or cracks in the resin-made pot body at the time of usage is avoided.

DETAIL DESCRIPTION OF THE INVENTION

Subsequently, embodiments of the invention will be described with reference to FIG. 1 to FIG. 7.

Figure 1:
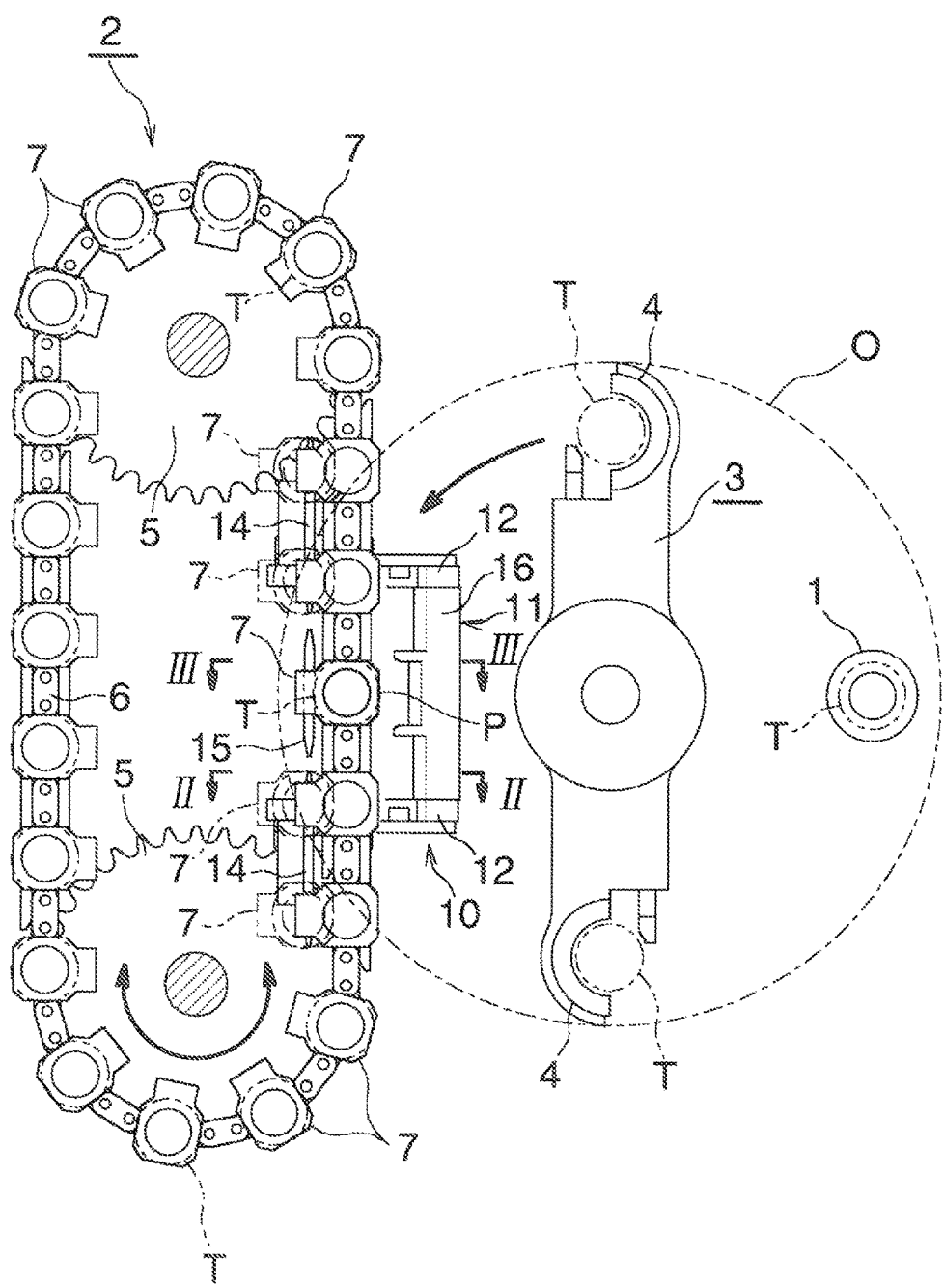
FIG. 1 is a bottom view of an automatic tool replacing apparatus provided with tool pots.
Figure 2:
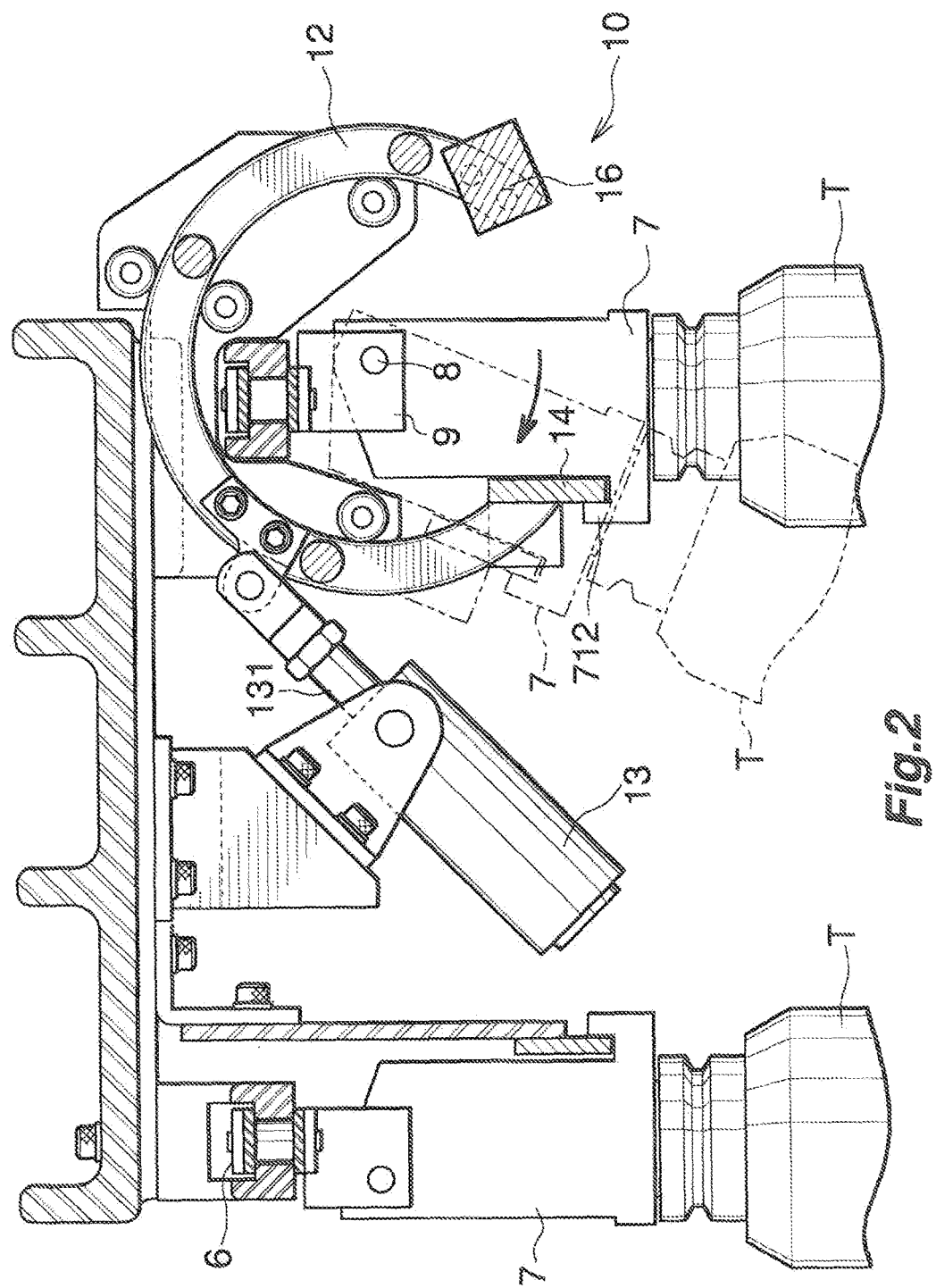
FIG. 2 is an enlarged vertical cross-sectional view taken along a line II-II in FIG. 1.
Figure 3:
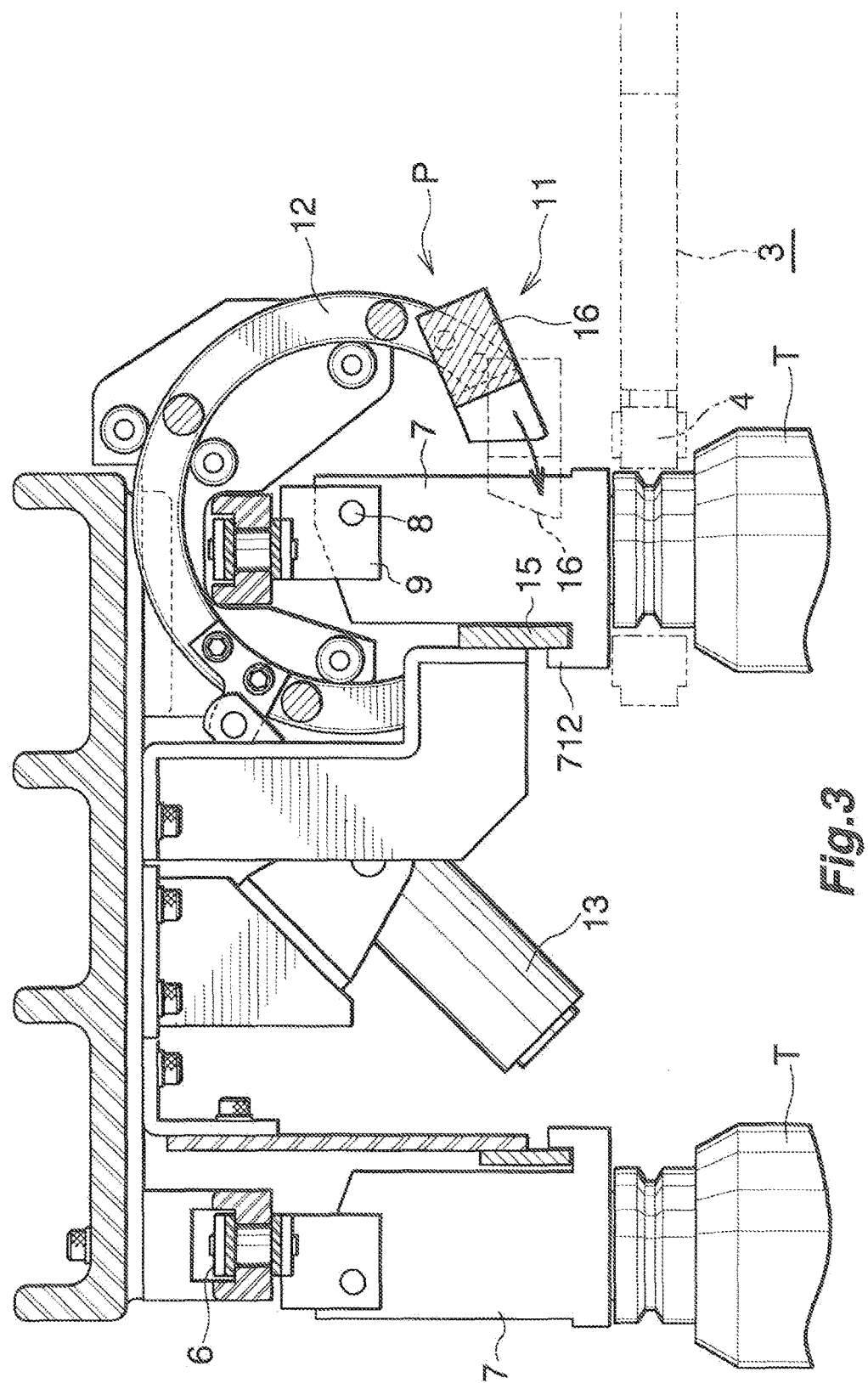
FIG. 3 is an enlarged vertical cross-sectional view taken along a line III-III in FIG. 1.

FIG. 1 to FIG. 3 illustrate an automatic tool replacing apparatus of a machining center provided with a tool pot, and FIG. 4 to FIG. 7 illustrate the tool pot of the invention in detail.

In the following description, an upper side of FIG. 1 corresponds to a "front", and a lower side of the same correspond to a "rear", and left and right of FIG. 1 corresponds to the "left and right".

The automatic tool replacing apparatus illustrated in FIG. 1 to FIG. 3 is configured to exchange tools (T) automatically with respect to a main shaft (1) rotatably supported by a main shaft head of the machining center about a vertical axis, and includes a horizontal chain-type tool magazine (2) and a tool replacement arm (3) configured to be rotatable about the vertical axis and movable up and down to exchange tools (T) between the main shaft (1) and the tool magazine (2).

Grippers (4) configured to grip the tools (T) are provided at both end portions of the tool replacement arm (3).

The tool magazine (2) includes a pair of front and rear sprockets (5) configured to be rotatable about the vertical axes, an endless chain (6) extending between the both sprockets (5) so as to be wound therearound, and a plurality of tool pots (7) mounted to the chain (6) at a distance in a longitudinal direction thereof and configured to retain the tool (T) downward.

As illustrated in FIG. 2 and FIG. 3, each of the tool pots (7) is secured at an upper end thereof to a bracket (9) fixed to the chain (6) via a horizontal pin (8) so as to be capable of pivoting. An engaging portion (712) having an L-shaped cross section provided at the lower end portion of each of the tool pots (7).

The automatic tool replacing apparatus described above includes a pivoting apparatus (10) configured to cause the two each of the tool pots (7) at both the front and rear sides of the tool pot (7) allocated at a tool handing over position (P) to pivot between an interference position (the position illustrated by solid lines in Figs . 1 and 2) located on a turning orbit (O) of the tool replacement arm (3) and a retracted position (the position illustrated by chain lines in FIGS. 1 and 2) retracted from the same turning orbit (O), and a fixing apparatus (11) configured to fix the tool pot (7) allocated at the tool handing over position (P).

The pivoting apparatus (10) includes two rotating members (12) arranged at both front and rear sides of the tool handing over position (P) and configured to be rotatable about a pivotal center of the tool pot (7) allocated at the tool handing over position (P), an air cylinder (13) configured to rotate the rotating members (12), and movable engaging plates (14) mounted on the respective rotating members (12) and configured to engage the engaging portion (712) of the two tool pots (7) on both front and rear sides of the tool pot (7) allocated at the tool handing over position (P).

The fixing apparatus (11) includes the two rotating members (12), the air cylinder (13), and a fixed engaging plate (15) provided in a fixed manner so as to engage the engaging portion (712) of the tool pot (7) allocated at the tool handing over position (P), and a gripping member (16) fixed so as to extend between the both rotating members (12) and configured to grip the tool pot (7) allocated at the tool handing over position (P).

In the automatic tool replacing apparatus described above, when the tool pot (7) that retains a next tool (T) is allocated at the tool handing over position (P) during machining with the main shaft (1), a piston rod (131) of the air cylinder (13) advances and the both rotating members (12) rotate clockwise indicated by an arrow in FIGS. 2 and 3.

Then, the movable engaging plates (14) engaging the engaging portions (712) of the each two tool pots (7) at the both front and rear side of the tool handing over position (P) also move in the same direction, and these four tool pots (7) pivot to the retracted positions where the tools (T) retained by the respective tool pots are retracted from the turning orbit (O) of the tool replacement arm (3) (See FIG. 2).

Simultaneously, the gripping member (16) also moves in the same direction, and the tool pot (7) allocated at the tool handing over position (P) is fixed by the gripping member (16) (see FIG. 3).

When machining by the tool (T) mounted to the main shaft (1) is terminated, the main shaft (1) moves to the tool replacement position, and then the tool replacement arm (3) is rotated from the waiting position to the tool gripping position by 90 degrees, the used tool (T) of the main shaft (1) is gripped by one of the grippers (4), and the next tool (T) of the tool pot (7) allocated at the tool handing over position (P) is gripped by the other gripper (4).

Subsequently, the tool replacement arm (3) is moved downward, and the used tool (T) is pulled out from the main shaft (1) and the next tool (T) is pulled out from the tool pot (7). Subsequently, the tool replacement arm (3) is rotated by 180 degrees and then is moved upward again, the next tool (T) is inserted into the main shaft (1) and the used tool (T) is inserted into the tool pot (7). The tool replacement arm (3) is subsequently rotated by 90 degrees and returns the waiting position. The replacement of the tool is terminated in this manner.

When the exchange of the tool is terminated, the piston rod (131) of the air cylinder (13) is retracted so that the both rotating members (12) rotate counterclockwise of FIGS. 2 and 3. Subsequently, the movable engaging plate (14) returns back a vertical state, and the each two tool pots (7) at the both front and rear sides of the tool handing over position (P) are pivoted rightward to the interference position. Simultaneously, the gripping member (16) is also moved counterclockwise in FIGS. 2 and 3 to move away from the tool pot (7), and fixation of the tool pot (7) allocated at the tool handing over position (P) is released.

Figure 4:
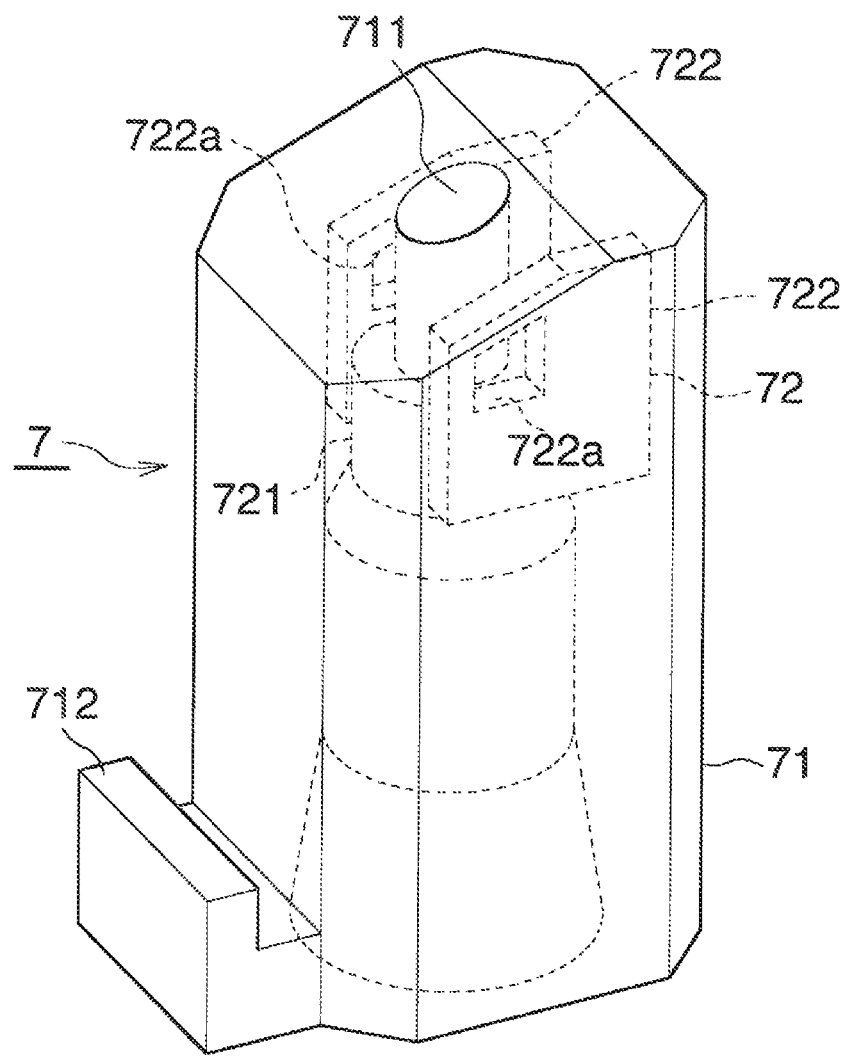
FIG. 4 is a perspective view of the tool pot according to the invention.
Figure 5:
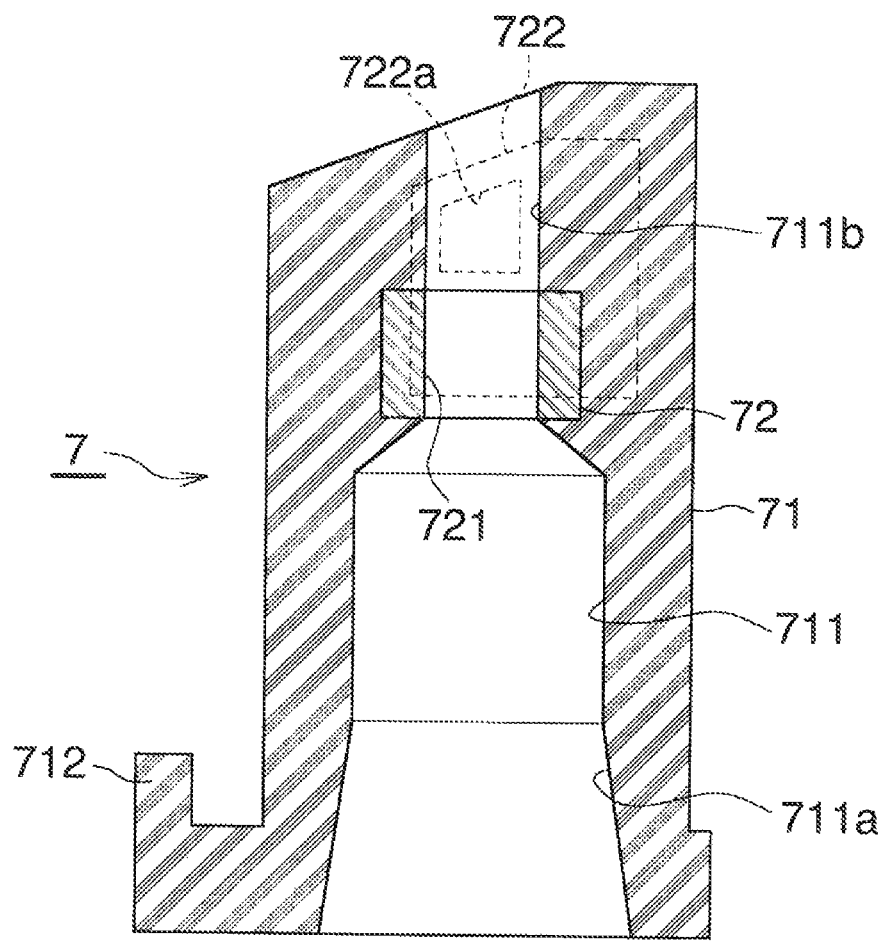
FIG. 5 is a vertical cross-sectional view of the same tool pot.

As illustrated in FIG. 4 and FIG. 5 in detail, the tool pot (7) of the invention is to be applied to the above-described automatic tool replacing apparatus, and includes a resin-made pot body (71) and a metallic reinforcing member (72) embedded in the pot body (71) by insert molding.

The pot body (71) has a substantially square rod shape, and includes a through hole (711) formed therein so as to extend in the interior thereof in a vertical axial direction. A lower portion of the through hole (711) includes a large-diameter insertion hole portion (711a) in which a shank (not illustrated) of the tool (T) is inserted. An upper portion of the through hole (711) includes a small-diameter retaining hole portion (711b) that retains a distal end portion of the shank.

An engaging portion (712) having an L-shaped cross section is provided at a lower end portion of the left side surface of the pot body (71) so as to be bent upward at a distal end thereof.

Approximately a two-third of the left side including an upper end opening of the through hole (711) of an upper end surface of the pot body (71) is formed into an inclined surface having a leftward and downward gradient.

Figure 6:
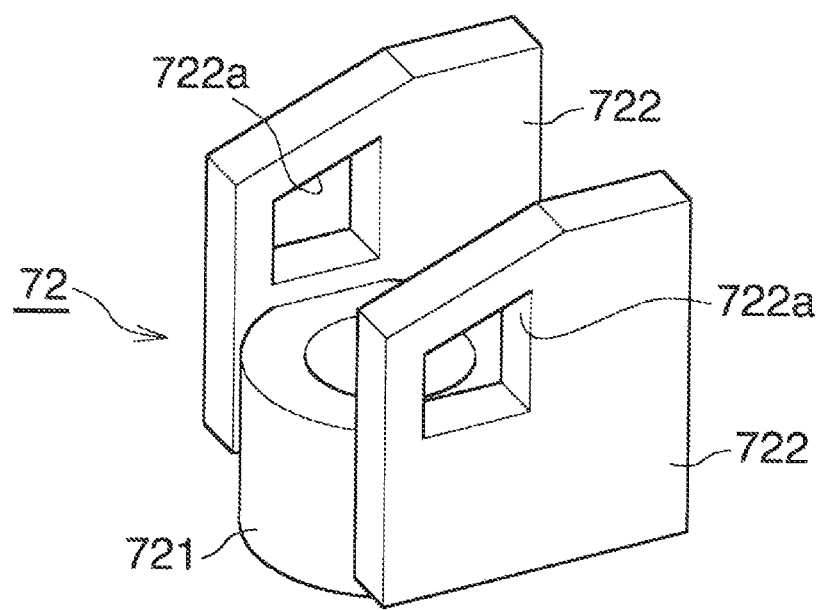
FIG. 6 is a perspective view of a reinforcing member of the same tool pot.

As illustrated in FIG. 6, the reinforcing member (72) includes a horizontal shaped reinforcing ring (721) and a pair of front and rear vertical reinforcing plates (722).

The reinforcing ring (721) is embedded in the pot body (71) so that an inner peripheral surface is exposed to the retaining hole portion (711b) of the pot body (71). Vertical joint surfaces (not illustrated) are formed at both front and rear sides of an outer peripheral surface of the reinforcing ring (721).

A pair of reinforcing plates (722) are joined at each left lower portion on one side thereof to the two front and rear vertical joint surfaces of the reinforcing ring (721) in advance by welding or the like. The both reinforcing plates (722) are completely embedded into an upper side portion of the pot body (71) by insert molding, and are arranged so as to face each other in the fore-and-aft direction with the retaining hole portion (711b) interposed therebetween. Parts of upper edges of the each reinforcing plates (722) are inclined in parallel to an inclined surface of an upper end of the pot body (71).

Figure 7:
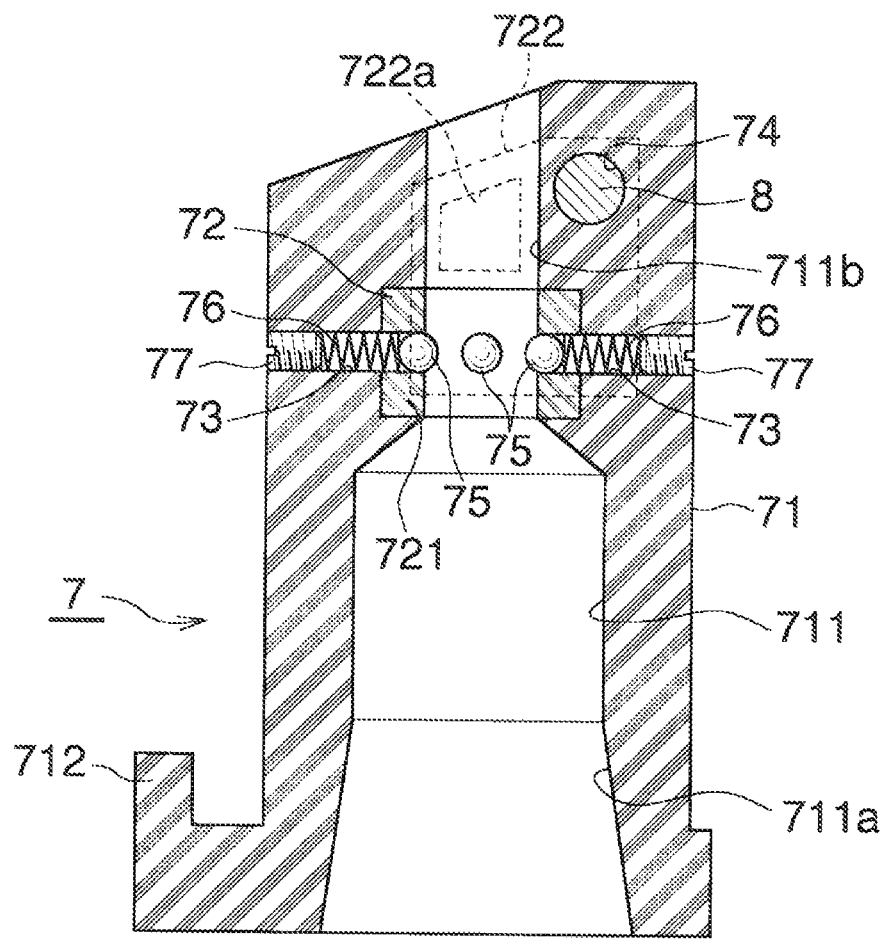
FIG. 7 is a vertical cross-sectional view illustrating a final product mode of the same tool pot.

The insert molded tool pot (7) is formed into a final product mode illustrated in FIG. 7 by a predetermined post-process applied thereto.

In other words, a plurality of ball housing holes (73) extending in a radial direction from an outer surface of the tool pot (7) are formed therethrough toward the retaining hole portion (711b) at regular intervals in the circumferential direction at an intermediate position of a height corresponding to the reinforcing ring (721) of the tool pot (7). Each of the ball housing holes (73) inserts a stainless ball (75) for retaining a distal end portion of the shank and a spring (76) configured to bias the ball (75) so that part of the ball (75)

projects into the retaining hole portion (711b), and a holding screw (77) for retaining the ball (75) and the spring (76) within the ball retaining hole (73) is retained with a screw.

A horizontal pin insertion hole (74) extending in a fore-and-aft direction therethrough is formed at an upper end portion of the tool pot (7) so as to penetrate through right upper portions of the pair of reinforcing plates (722) so as to avoid the retaining hole portion (711b). The horizontal pin (8) for securing the tool pot (7) to the bracket (9) is inserted through the horizontal pin insertion hole (74).

Each of the front and rear reinforcing plates (722) of the reinforcing member (72) is provided with a lightening hole (722a) so as to avoid the horizontal pin insertion hole (74). More specifically, the lightening holes (722a) are formed on an upper left portions of the pair of reinforcing plates (722) facing each other in the fore-and-aft direction with the retaining hole portion (711b) interposed therebetween. The lightening hole (722a) has a square shape, and an upper edge thereof is inclined so as to be parallel to an inclined portion at an upper edge of the reinforcing plates (722).

In the related art, a portion where the lightening hole (722a) is formed is a portion where a thermal stress tends to be generated in the pot body (71) when the pot body (71) and the reinforcing member (72) are cooled to a normal temperature after the insert molding. In the tool pot (7) of this embodiment, the lightening holes (722a) are formed at the above-described portions of the pair of reinforcing plates (722) of the reinforcing member (72). Therefore, the portion around the lightening holes (722a) of the each reinforcing plates (722) is resiliently deformed easily and the thermal contraction of the pot body (71) is not hindered, whereby generation of the thermal stress is restricted. Since the lightening holes (722a) are formed respectively at portions of the both reinforcing plates (722) where the horizontal pin (8) is not inserted, a function of the reinforcing plates (722) that reinforces the horizontal pin insertion portions is not impaired. In addition, the lightening hole (722a) may be formed easily by applying press process on each of the reinforcing plates (722).

The invention is not limited to those described in the above-described embodiment, and may be applied to the tool pot of various modes.

In the above-described embodiment, generation of the thermal stress in the pot body is restrained by forming the lightening holes in the reinforcing members. However, the configuration other than the lightening hole, for example, lightening portions formed of depressions or notched portions may be formed at a required position on the reinforcing members.

What is claimed is:
1. A tool pot comprising;
a resin-made pot body; and
a metallic reinforcing member embedded in the pot body by insert molding,
wherein
the pot body includes a through hole in a vertical axial direction, and a portion of one end side of the through hole constitutes an insertion hole portion in which a shank of the tool is inserted, and a portion of the other end side of the through hole constitutes a retaining hole portion that retains a distal end portion of the shank, and
the reinforcing member consists of a pair of reinforcing plates embedded in the pot body so as to face each other in the fore-and-aft direction with the retaining hole portion interposed therebetween, and an entire surface of each of the reinforcing plates is covered by the pot body, and
at least on portion to reduce generation of thermal stress is formed in each of the reinforcing plates, the portion is formed of a thickness cut-off hole, and a portion around the thickness cut-off hole is resiliently deformable without hindering thermal contraction of the pot body at the time of cooling after the insert molding, a horizontal pin is inserted in the pot body so as to penetrate through the pair of reinforcing plates and avoid the retaining hole portion, the reinforcing member further comprises a reinforcing ring embedded in the pot body so that an inner peripheral surface of the reinforcing ring is exposed to the retaining hole portion, the reinforcing ring is joined at part of opposing surfaces of the pair of the reinforcing plates, a plurality of holes each for housing a ball that retain a distal end portion of the shank are formed therethrough at the reinforcing ring and a portion of each of the reinforcing plates joined to the reinforcing ring at regular intervals in the circumferential direction of the reinforcing ring, the portion to reduce generation of thermal stress is formed on the each of the reinforcing plates so as to avoid a portion that the horizontal pin penetrates through and the portion joined to the reinforcing ring, the thickness cut-off hole constituting the portion to reduce generation of thermal stress is provided in proximity to a required corner portion of each reinforcing plate, and the thickness cut-off hole has the shape of a square including two intersecting edges respectively extending in parallel to corresponding two intersecting edges of the reinforcing plate, and the two intersecting edges of the reinforcing plate constitute the corner portion.

2. The tool pot according to claim 1, wherein
a horizontal pin is inserted in the pot body so as to penetrate through the pair of reinforcing plates and avoid the retaining hole portion, and the portion to reduce generation of thermal stress is formed on each of the reinforcing plates so as to avoid a portion that the horizontal pin penetrates through.

3. The tool pot according to claim 1, wherein
the reinforcing member further comprises a reinforcing ring embedded in the pot body so that an inner peripheral surface of the reinforcing ring is exposed to the retaining hole portion, the reinforcing ring is joined at part of opposing surfaces of the pair of the reinforcing plates, and
a plurality of holes each for housing a ball that retain a distal end portion of the shank are formed therethrough at the reinforcing ring and a portion of each of the reinforcing plates joined to the reinforcing ring at regular intervals in the circumferential direction of the reinforcing ring, and
the portion to reduce generation of thermal stress is formed on the each of the reinforcing plates so as to avoid the portion joined to the reinforcing ring.

4. The tool pot according to claim 1, wherein
the portion to reduce generation of thermal stress is formed, in each reinforcing plate, at a position overlapping the retaining hole portion when seen from the direction in which the reinforcing plates face each other.

5. A tool pot comprising:
a resin-made pot body; and a metallic reinforcing member embedded in the pot body by insert molding, wherein the pot body includes a through hole in a vertical axial direction, and a portion of one end side of the through hole constitutes an insertion hole portion in which a shank of the tool is inserted, and a portion of the other end side of the through hole constitutes a retaining hole portion that retains a distal end portion of the shank, and the reinforcing member consists of a pair of reinforcing plates embedded in the pot body so as to face each other in the fore-and-aft direction with the retaining hole portion interposed therebetween, and at least one portion to reduce generation of thermal stress is formed in each of the reinforcing plates, the portion is formed of a thickness cut-off hole, and a portion around the thickness cut-off hole is resiliently deformable without hindering thermal contraction of the pot body at the time of cooling after the insert molding, a horizontal pin is inserted in the pot body so as to penetrate through the pair of reinforcing plates and avoid the retaining hole portion, the reinforcing member further comprises a reinforcing ring embedded in the pot body so that an inner peripheral surface of the reinforcing ring is exposed to the retaining hole portion, the reinforcing ring is joined at part of opposing surfaces of the pair of the reinforcing plates, a plurality of holes each for housing a ball that retain a distal end portion of the shank are formed therethrough at the reinforcing ring and a portion of each of the reinforcing plates joined to the reinforcing ring at regular intervals in the circumferential direction of the reinforcing ring, the portion to reduce generation of thermal stress is formed on the each of the reinforcing plates so as to avoid a portion that the horizontal pin penetrates through and the portion joined to the reinforcing ring, the thickness cut-off hole constituting the portion to reduce generation of thermal stress is provided in proximity to a required corner portion of each reinforcing plate, and the thickness cut-off hole has the shape of a square including two intersecting edges respectively extending in parallel to corresponding two intersecting edges of the reinforcing plate, and the two intersecting edges of the reinforcing plate constitute the corner portion.

* * * * *